United States Patent [19]

Nakayama

[11] Patent Number: 4,884,284
[45] Date of Patent: Nov. 28, 1989

[54] SPREAD SPECTRUM RECEIVER

[75] Inventor: Shigeyuki Nakayama, Koganei, Japan

[73] Assignee: Kabushiki Kaisha Kenwood, Tokyo, Japan

[21] Appl. No.: 247,607

[22] Filed: Sep. 22, 1988

[30] Foreign Application Priority Data

Sep. 26, 1987 [JP] Japan .................................. 62-239977

[51] Int. Cl.$^4$ ........................... H04K 1/04; H04L 9/00
[52] U.S. Cl. .......................................................... 375/1
[58] Field of Search ............................. 375/1; 380/34

[56] References Cited

U.S. PATENT DOCUMENTS

| | | | |
|---|---|---|---|
| 4,121,159 | 10/1978 | Lampert | 375/1 |
| 4,538,281 | 8/1985 | Rajan | 375/1 |
| 4,559,633 | 12/1985 | Kan et al. | 375/1 |
| 4,587,661 | 5/1986 | Schiff | 375/1 |
| 4,752,939 | 6/1988 | Amoroso et al. | 375/1 |

Primary Examiner—Salvatore Cangialosi
Attorney, Agent, or Firm—Gerald J. Ferguson, Jr.

[57] ABSTRACT

A receiver in a spread spectrum communication system includes: a noise detector for detecting noises of a spread spectrum input signal; an initial synchronization circuit including a correlator for detecting a correlation of the spread spectrum input signal, a detector circuit for detecting an output of the correlator, and a comparator for receiving an output of the detector circuit and outputting a correlation detection signal; a synchronization holding circuit for receiving the correlation detection signal to perform synchronization holding and outputting a synchronization holding signal during the synchronization holding; and a control circuit for detecting if the synchronization holding signal is outputted within a predetermined period, and if not, controlling a reference voltage to be supplied to the comparator in accordance with the noise detection output of the noise detecting means.

2 Claims, 2 Drawing Sheets

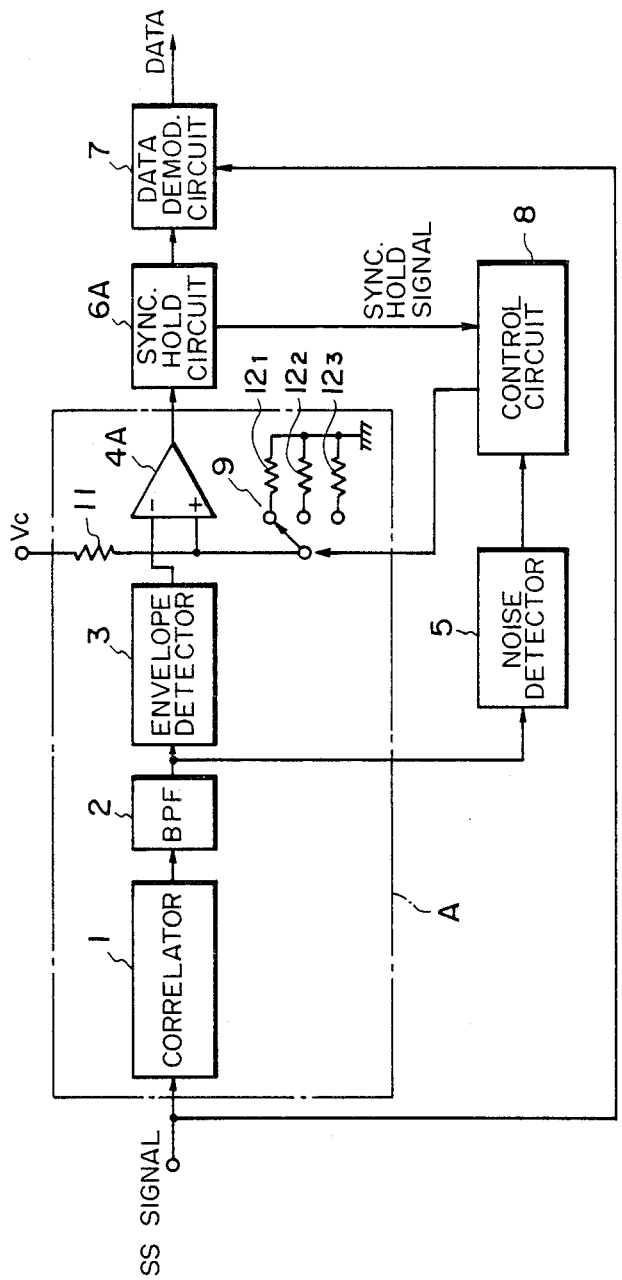
F I G. 1

4,884,284

SPREAD SPECTRUM RECEIVER

FIELD OF THE INVENTION

The present invention relates to a spread spectrum communication system.

CONVENTIONAL ART

The spread spectrum system includes the following systems.
(1) DS (Direct Sequence) system
(2) FH (Frequency Hopping) system
(3) TH (Time Hopping) system
(4) Pulse coding FM system
(5) Hybrid system In general, at present, the DS and FH systems are used, the TH system and pulse coding FM system are applied to the limited fields, and the hybrid system is being theoretically studied. The principle of the DS system will now be described. On the transmission side, the information signal is subjected to an ordinary modulation (primary modulation). The primary-modulated signal is then modulated by the spread pseudo noise code (spread PN code) of a wide band and transmitted as a wide band signal having a very small power density. This operation is called a spread modulation. On the reception side, the correlation with the received or incoming signal is derived by use of the same demodulating PN code as that on the transmission side. After the correlation was obtained, only the signal to be received is converted into the original primary-modulated signal of the narrow band. The other signals and interference signal become the wide band noises having a small power density. Only a desired signal is extracted by a filter. The primary modulation can use the analog system such as FM and the digital system such as PSK. In general, the PSK system by the pseudo noise (PN) code is used as the spread modulation.

It is required that the demodulating PN code which is generated on the reception side has the same bit constitution and the same phase as those of the PN code in the incoming or received spread spectrum signal. Therefore, the initial synchronization (synchronization trapping) is performed to make the phase of the PN code on the reception side coincide with the phase of the PN code in the incoming signal. Next, in order to keep the phase-coinsident PN code on the reception side, the synchronization holding process is performed by a delay-locked loop circuit (DLL).

The DLL circuit enables the despreader circuit which despreads the received signal to demodulated the transmission data in the demodulator by keeping the synchronization of a PN code generated from the PN generator with a PN code which spreads the received signal. To keep the synchronization of the PN code with the received signal is performed by controlling the frequency of a clock signal applied to the PN generator. For an initial synchronization, the phase state of the PN code in the received signal is detected by the PN synchronization circuit (PN SYNC) and the detection output from PN SYNC is used to obtain the initial synchronization. After a correlation detection circuit (PN SYNC) and the correlation detection output is used to take the initial synchronization. After the initial synchronization, &he synchronization is kept by the DLL circuit.

In a receiver of a conventional spread spectrum communication system, a correlation detection signal has been used as the synchronization holding information signal. For example as shown in FIG. 2, a correlation output signal from a correlation detector 1 is passed through a band-pass filter 2 to remove unnecessary components thereof, and thereafter it is detected by an envelope detector circuit 3 whose output is supplied to a comparator 4 to compare the detector output with a fixed reference voltage. An output from the comparator 4 is supplied as the correlation detection signal to a synchronization holding circuit 6 constructed of a delayed-locked loop circuit which supplies a local code signal in synchro with the correlation detection signal to a data demodulator circuit 7 to obtain demodulated data.

The correlation output signal varies with the C/N value of an incoming signal. Therefore, if a fixed reference voltage as conventional is supplied to the comparator 4 for detecting a correlation, the correlation detection signal may or may not be generated depending upon the output level of the envelope detector circuit 3. Specifically in the case where the C/N value is small and the input signal level to the comparator 4 is lower than the fixed reference voltage, an ordinary correlation detection signal, i.e., a correlation detection signal for locking the delayed-lock loop circuit constituting the synchronization holding circuit 6, is not generated with the result that the synchronization holding circuit cannot operate normally.

SUMMARY OF THE INVENTION

It is an object of the present invention to solve the above problem and provide a receiver enabling a stable initial synchronization operation even with a low C/N value.

To solve the above problems, the receiver according to the present invention comprises noise detecting means for detecting noises of a spread spectrum input signal; an initial synchronization circuit including a correlator for detecting a correlation of the spread spectrum input signal, a detector circuit for detecting an output of the correlator, and a comparator for receiving an output of the detector circuit and outputting a correlation detection signal; a synchronization holding circuit for receiving the correlation detection signal to perform synchronization holding and outputting a synchronization holding signal during the synchronization holding; and a control circuit for detecting if the synchronization holding signal is outputted within a predetermined period, and if not, controlling a reference voltage to be supplied to the comparator in accordance with the noise detection output of the noise detecting means.

According to the present invention, the reference voltage of the comparator and the predetermined period are set such that the synchronization holding circuit can perform synchronization holding when the C/N value is larger than a standard value. Therefore, if the noise level of the spread spectrum input signal takes a value which makes the C/N value larger than the standard value, the control circuit does not make the reference voltage to change for enabling the synchronization holding.

If an output of the detector circuit reduces smaller than the reference voltage, the correlation holding signal is not outputted nor the synchronization holding signal is outputted from the synchronization holding circuit. If the synchronization holding signal is not outputted within the predetermined period, the noise detection output from the noise detecting means is checked. In this case, the C/N value takes a smaller value than the standard value. Thus, the noise detection output level increases and exceeds a preset value. The control circuit checking such an increased level causes the reference voltage of the comparator to become lower. As a result, the correlation detection signal can be outputted.

BRIEF DESCRIPTION OF THE DRAWINGS

FIG. 1 is a block diagram showing the circuit arrangement of an embodiment of the receiver according to the present invention.

DETAILED DESCRIPTION OF THE EMBODIMENT

Figure 2:
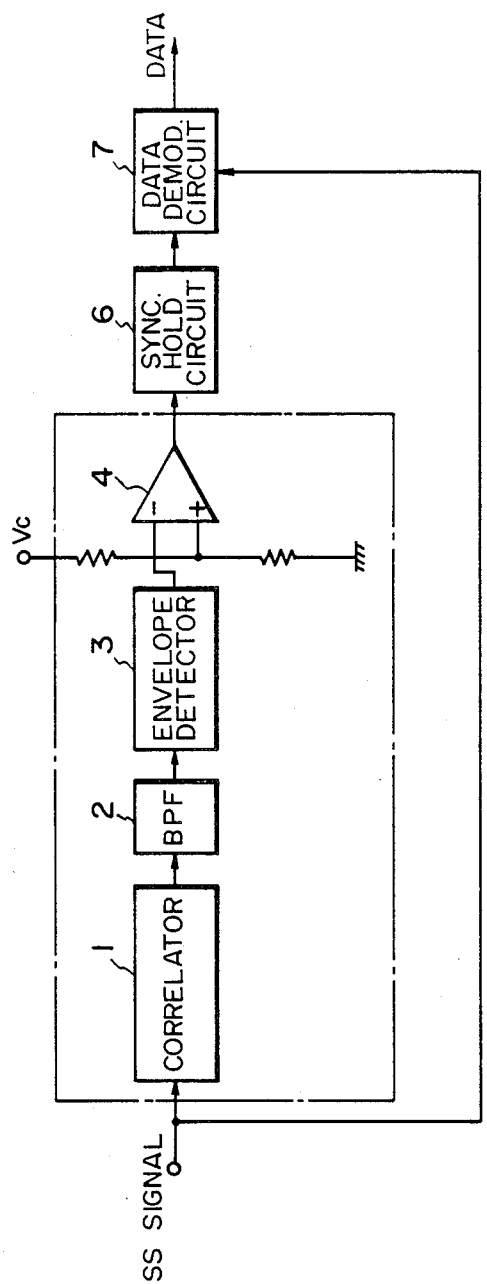
FIG. 2 is a block diagram showing the circuit arrangement of a conventional receiver.

FIG. 1 is a block diagram showing the circuit arrangement of an embodiment of the receiver according to the present invention.

An initial synchronization circuit A comprises a correlator 1 for detecting a correlation of an inputted spread spectrum signal, the correlator 1 being constructed of a SAW convolver, SAW correlator and the like, a band-pass filter 2 for removing unnecessary components of a correlation output of the correlator 1, an envelope detector circuit 3 for envelope-detecting an output of the band-pass filter 2, and a comparator 4A for comparing a detection output of the envelope detector circuit 3 with a reference voltage. The initial synchronization circuit A further comprises a resistor 11 and resistors $12_1$ to $12_3$ for dividing a voltage of Vc power source, and a switch 9 for selectively supplying as the reference voltage one of the voltages at the resistors $12_1$, $12_2$, and $12_3$ to the comparator 4A.

An output of the comparator 4A is supplied to a synchronization holding circuit 6A which outputs a local reference code train synchronizing with the correlation detection signal to a data demodulator circuit 7 which demodulates the spread spectrum signal.

An output of the band-pass filter 2 is supplied to a noise detector circuit 5 which detects noises of the output of the band-pass filter 2. The synchronization holding circuit 6A outputs a local reference code for demodulation to the data demodulator circuit 7 as well as a synchronization holding signal to a control circuit 8 when the correlation detection signal generated by the initial synchronization circuit A is received and the synchronization holding condition is being maintained. The noise detection signal outputted from the noise detector circuit 5 and the synchronization holding signal are sent to the control circuit 8. The control circuit 8 checks if the synchronization holding signal is outputted within the predetermined period, and if not, it checks the noise detection signal to move the switch 9.

In operation of the embodiment of this invention constructed as above, the correlation output signal detected by the correlator 1 is passed to the band-pass filter 2 to remove therefrom unnecessary components, and thereafter detected by the envelope detector circuit 3. The detected signal is supplied to the comparator 4A to be compared with the reference voltage. Noises of an output of the band-pass filter 2 are detected by the noise detector circuit 5.

The predetermined period is set to such a value that the initial synchronization can be surely obtained when the C/N value takes a standard value. Similarly, the switch 9 is controlled to move to a position where a reference voltage to be supplied to the comparator 4 ensures that the initial synchronization can be surely obtained at that position.

As appreciated from the above, while a spread spectrum signal with a C/N value larger than a standard value is supplied, the initial synchronization circuit A can output the correlation detection signal. The correlation detection signal is received by the synchronization holding circuit 6A which outputs the synchronization holding signal to the control circuit 8. In this case, the noise level at the noise detector circuit 5 is low so that the switch 9 is not changed and accordingly the reference voltage of the comparator is maintained unchanged. As above, the correlation detection signal is outputted reliably from the initial synchronization circuit A to lock the synchronization holding circuit 6A.

Next, the description will be given for the case where noises increases and the C/N value reduces to the value smaller than the standard value.

In such a case, the output voltage of the envelope detector circuit 3 becomes lower than the reference voltage so that the correlation detection signal cannot be outputted from the initial synchronization circuit A. As a result, the correlation detection signal is not supplied to the synchronization holding circuit 6A so that the circuit cannot be locked and maintains unlocked. Thus, the synchronization holding signal cannot be supplied to the control circuit 8. When the synchronization holding signal is not supplied to the control circuit after the lapse of the predetermined period, the control circuit 8 causes the noise detector circuit 5 to check the noises. If the noise output level checked by the noise detector circuit 5 exceeds a preset level, the control circuit 8 causes the switch 9 to move to a position where a lower reference voltage corresponding to the checked noise level is supplied to the comparator 4A. Consequently, the correlation detection signal can be detected by the initial synchronization circuit A. If the correlation detection signal cannot be detected even after such a control operation, the similar operation is repeated. If the noise output level of the noise detector circuit 5 is lower than a preset level, the control circuit 8 does not cause the switch 9 to move but to remain unchanged until the correlation detection signal is outputted from the initial synchronization circuit A. The reason for this is that such a low noise level will eventually lead to obtain an initial synchronization.

As seen from the foregoing description of the invention, if the synchronization holding signal is not outputted within the predetermined period, the noise level of the inputted spread spectrum signal is checked and the reference voltage of the comparator constituting a part of the initial synchronization circuit is changed. The reference voltage of the comparator is selected in accordance with the noise level of the inputted spread spectrum signal so that the correlation detection signal can be detected stably and the initial synchronization can be obtained fast. Further, it is possible to prevent a pseudo correlation detection signal from being generated due to a pseudo correlation output by a high level input signal. Furthermore, it is possible to prevent a correlation detection signal from being not detected due to a low detected output level by a small C/N value.

What is claimed is:

1. A receiver in a spread spectrum communication system comprising:

an initial synchronization circuit including a correlator for detecting a correlation of the spread spectrum input signal, a detector circuit for detecting an output of said correlator, and a comparator for receiving an output of said detector circuit an outputting a correlation detection signal;

a synchronization holding circuit for receiving the correlation detection signal to perform synchronization holding and outputting a synchronization holding signal during the synchronization holding;

noise detecting means for detecting noises of the correlation detection signal;

and a control circuit for detecting if the synchronization holding signal is outputted within a predetermined period, and if not, controlling a reference voltage to be supplied to said comparator in accordance with the noise detection output of said noise detecting means.

2. A receiver according to claim 1 further comprising reference voltage generating means for generating a plurality of reference voltages, one of the reference voltages being selectedly applied to said comparator under the control of said control circuit.

* * * * *